(12) United States Patent
Sabouné

(10) Patent No.: US 7,797,818 B2
(45) Date of Patent: Sep. 21, 2010

(54) FLEXIBLE MODULAR SYSTEMS FOR CONSTRUCTING A WIRELESS COMMUNICATION TERMINAL

(75) Inventor: Michel Sabouné, Torna Hällestad (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 11/867,325

(22) Filed: Oct. 4, 2007

(65) Prior Publication Data

US 2009/0070991 A1 Mar. 19, 2009

Related U.S. Application Data

(60) Provisional application No. 60/972,082, filed on Sep. 13, 2007.

(51) Int. Cl.
*B23P 21/00* (2006.01)
*B23Q 15/00* (2006.01)

(52) U.S. Cl. .............................. 29/718; 29/622; 29/717; 29/729; 455/550.1; 455/566; 455/575.1; 455/575.6

(58) Field of Classification Search .................... 29/622, 29/854, 874, 718, 717, 729; 455/550.1, 566, 455/575.1, 575.6
See application file for complete search history.

(56) References Cited

U.S. PATENT DOCUMENTS

| | | | |
|---|---|---|---|
| 6,219,257 B1 | 4/2001 | Arnold | |
| 6,714,802 B1 * | 3/2004 | Barvesten | ................ 455/575.1 |
| 7,039,754 B2 | 5/2006 | Sasaki | |
| 7,079,292 B2 | 7/2006 | Silverbrook et al. | |
| 7,283,841 B2 | 10/2007 | Luke et al. | |
| 7,304,864 B2 | 12/2007 | Chen et al. | |
| 2006/0084465 A1 | 4/2006 | Kim | |
| 2006/0183512 A1 | 8/2006 | Segawa et al. | |
| 2007/0004451 A1 | 1/2007 | Anderson | |
| 2007/0129099 A1 | 6/2007 | Lee | |

FOREIGN PATENT DOCUMENTS

| | | |
|---|---|---|
| EP | 1 357 726 A1 | 10/2003 |
| EP | 1 816 540 A1 | 8/2007 |
| JP | 10-155013 | 6/1998 |
| JP | 10 155013 A | 6/1998 |

OTHER PUBLICATIONS

International Search Report and the Written Opinion of the International Searching Authority for PCT Application No. PCT/EP2008/052746, mailed Jun. 18, 2008.

* cited by examiner

*Primary Examiner*—Thiem Phan
(74) *Attorney, Agent, or Firm*—Myers Bigel Sibley & Sajovec, PA

(57) ABSTRACT

A flexible modular system for constructing a wireless communication terminal includes a keypad module and a display module. The keypad module includes a keypad module housing and a keypad mounted on the keypad module housing. The display module includes a display module housing and a display device mounted on the display module housing. The flexible modular system further includes a connector subsystem to selectively alternatively mechanically join the keypad module and the display module to form an integral wireless communication terminal having a first form factor and, alternatively, an integral wireless communication terminal having a second form factor different from the first form factor.

22 Claims, 14 Drawing Sheets

FLEXIBLE MODULAR SYSTEMS FOR CONSTRUCTING A WIRELESS COMMUNICATION TERMINAL

RELATED APPLICATION(S)

The present application claims the benefit of and priority from U.S. Provisional Patent Application Ser. No. 60/972,082, filed Sep. 13, 2007, the disclosure of which is incorporated herein by reference in its entirety.

FIELD OF THE INVENTION

The present invention relates to electronic devices and, more particularly, to wireless mobile communications terminals and systems and methods for forming the same.

BACKGROUND OF THE INVENTION

Mobile wireless communication terminals such as cellular telephones are available in various popular alternative form factors. Such form factors include a stick phone, a flip phone, a swivel phone and a slider phone. Each of these form factors may be more or less desirable to different users.

SUMMARY OF THE INVENTION

According to embodiments of the present invention, a flexible modular system for constructing a wireless communication terminal includes a keypad module and a display module. The keypad module includes a keypad module housing and a keypad mounted on the keypad module housing. The display module includes a display module housing and a display device mounted on the display module housing. The flexible modular system further includes a connector subsystem to selectively alternatively mechanically join the keypad module and the display module to form an integral wireless communication terminal having a first form factor and, alternatively, an integral wireless communication terminal having a second form factor different from the first form factor.

According to some embodiments, the first and second form factors are each selected from the group consisting of a stick phone configuration, a flip phone configuration, a swivel phone configuration, and a slider phone configuration.

In some embodiments, the connector subsystem can be used to selectively alternatively mechanically join the keypad module and the display module to form an integral wireless communication terminal having a third form factor different from the first and second form factors.

According to some embodiments, the connector subsystem includes a first connector module, and the first connector module can be interchangeably mounted between the keypad module and the display module to selectively mechanically join the keypad module and the display module to form the integral wireless communication terminal having the first form factor.

The connector subsystem may further include a second connector module, wherein the second connector module can be interchangeably mounted between the keypad module and the display module to selectively mechanically join the keypad module and the display module to form the integral wireless communication terminal having the second form factor.

The connector module may include at least one mechanical coupling feature to secure the connector module to each of the keypad module and the display module, and at least one electrical connector to electrically couple the keypad module to the display module.

According to some embodiments, the connector module includes an integral supplemental functional electronic device. In some embodiments, the supplemental functional electronic device includes a removable memory card slot. In some embodiments, the supplemental functional electronic device includes a camera. In some embodiments, the supplemental functional electronic device includes a radiofrequency receiver, transmitter and/or transceiver. In some embodiments, the supplemental functional electronic device includes a flashlight. In some embodiments, the supplemental functional electronic device includes a battery. In some embodiments, the supplemental functional electronic device includes a kinetic motion electrical generator. In some embodiments, the supplemental functional electronic device includes a supplemental display device. In some embodiments, the supplemental functional electronic device includes a loudspeaker.

According to embodiments of the present invention, a method for constructing a wireless communication terminal includes providing a flexible modular system including: a keypad module including a keypad module housing and a keypad mounted on the keypad module housing; a display module including a display module housing and a display device mounted on the display module housing; and a connector subsystem to selectively alternatively mechanically join the keypad module and the display module to form an integral wireless communication terminal having a first form factor and, alternatively, an integral wireless communication terminal having a second form factor different from the first form factor. The method further includes mechanically joining the keypad module and the display module using the connector subsystem to form an integral wireless communication terminal having a desired one of the first and second form factors.

According to some embodiments, the method includes selecting the first and second form factors from the group consisting of a stick phone configuration, a flip phone configuration, a swivel phone configuration, and a slider phone configuration.

According to some embodiments, the connector subsystem includes a first connector module, and the method includes mounting the first connector module between the keypad module and the display module to mechanically join the keypad module and the display module to form the integral wireless communication terminal having the first form factor.

The connector module may include an integral supplemental functional electronic device. In some embodiments, the supplemental functional electronic device includes at least one of a camera, a removable memory card slot, a radiofrequency receiver, transmitter and/or transceiver, a flashlight, a battery, a kinetic motion electrical generator, a supplemental display device, and a loudspeaker.

According to embodiments of the present invention, a connector module for use with a keypad module and a display module, the keypad module including a keypad module housing and a keypad mounted on the keypad module housing, the display module including a display module housing and a display device mounted on the display module housing, is provided. The connector module is adapted to mechanically join the keypad module and the display module to form an integral wireless communications terminal having a desired form factor.

In some embodiments, the connector module includes at least one mechanical coupling feature to secure the connector module to each of the keypad module and the display module, and at least one electrical connector to electrically couple the keypad module to the display module.

The connector module may include an integral supplemental functional electronic device. In some embodiments, the supplemental functional electronic device includes at least one of a camera, a removable memory card slot, a radiofrequency receiver, transmitter and/or transceiver, a flashlight, a battery, a kinetic motion electrical generator, a supplemental display device, and a loudspeaker.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
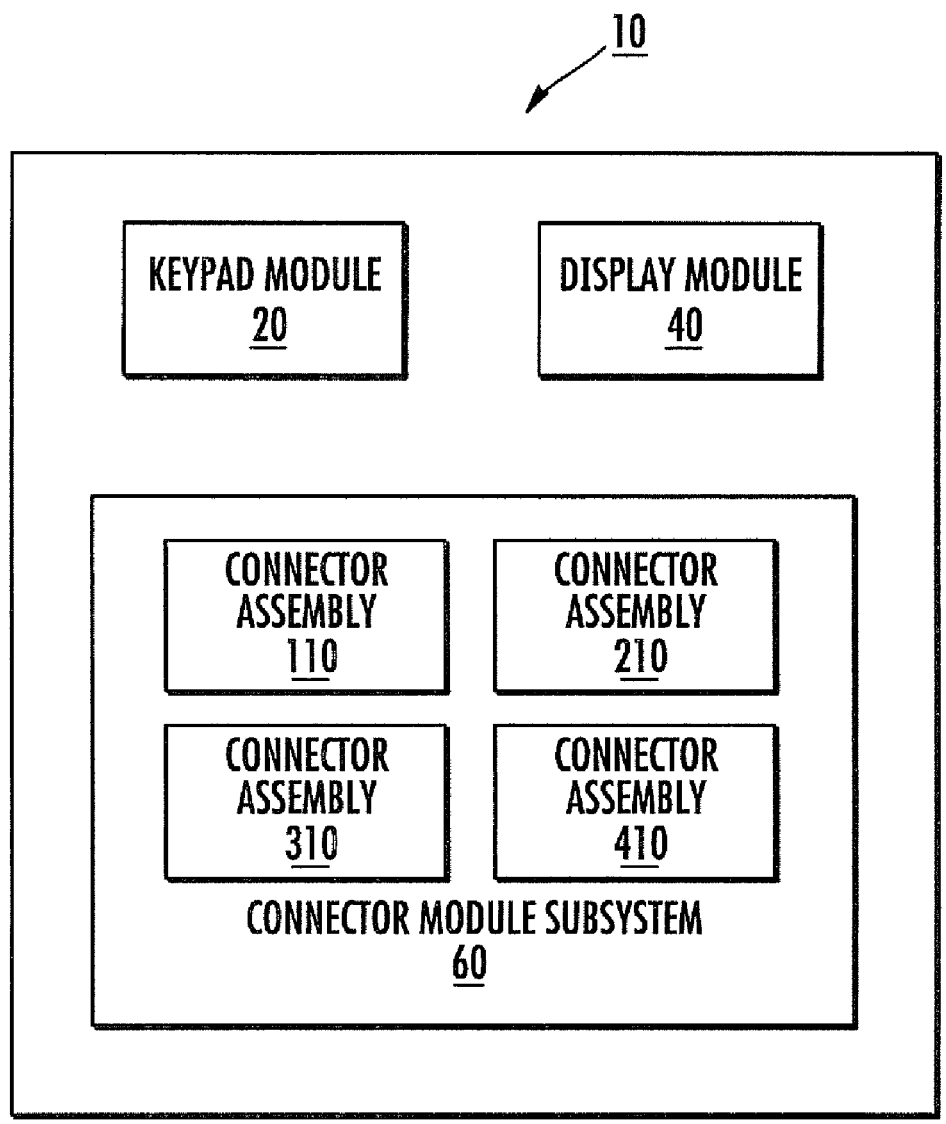
FIG. 1 is a schematic block diagram of a flexible modular system for constructing wireless communication terminals according to embodiments of the present invention.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

As used herein, the common abbreviation "e.g. ", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

As used herein, "electronic component" means an active device as contrasted with a passive electrical connector or the like. An electronic component may include a processor.

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

When the communication terminal is configured to communicate over a wireless interface, it is referred to herein as a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

Figure 2:
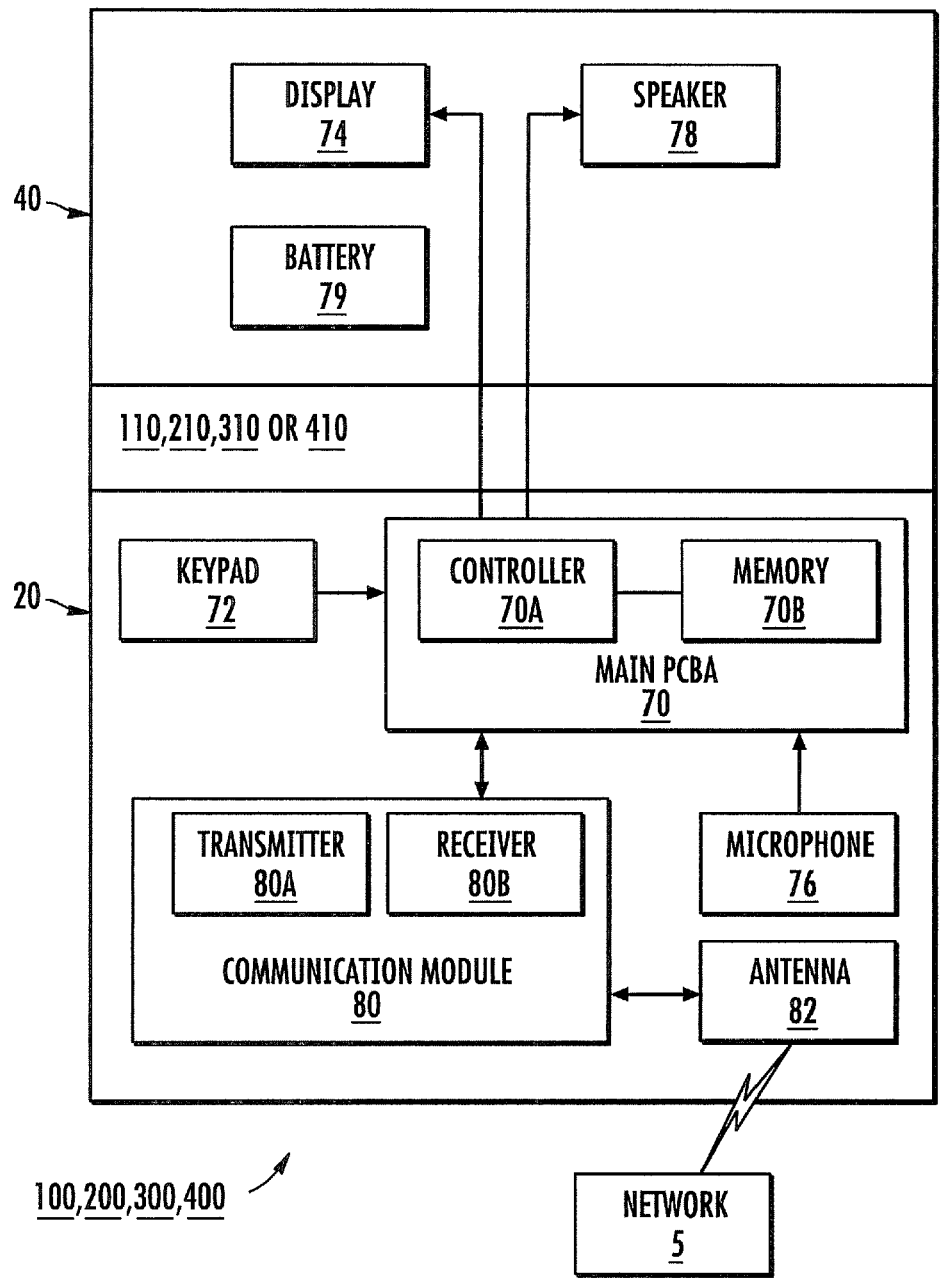
FIG. 2 is a block diagram of an exemplary radiotelephone communication system according to embodiments of the present invention.
Figure 3:
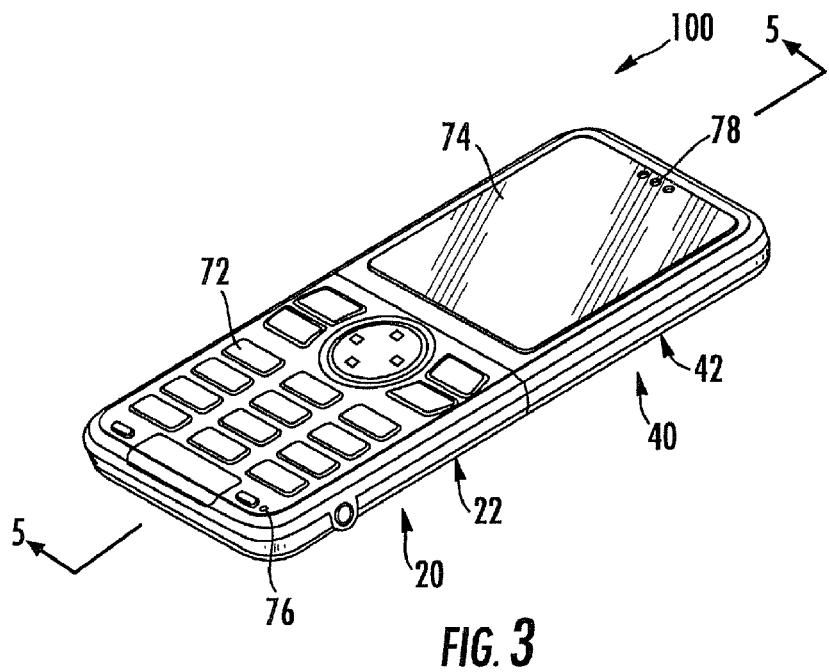
FIG. 3 is a front, perspective view of a mobile communication terminal according to embodiments of the present invention.
Figure 5:
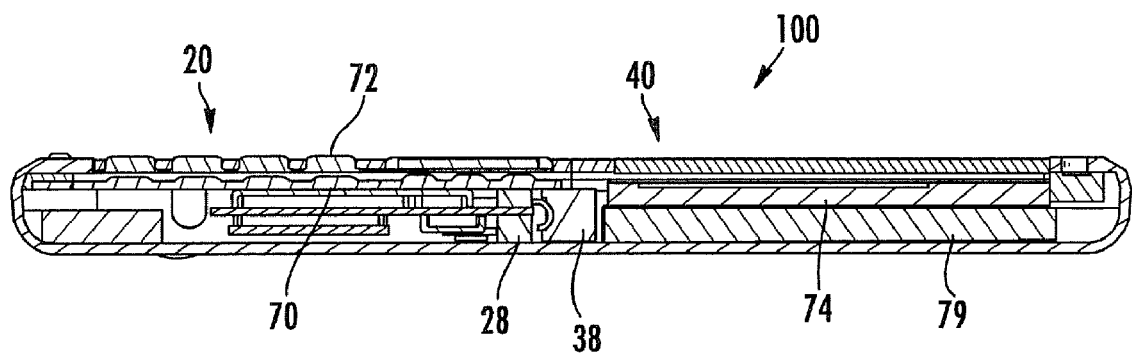
FIG. 5 is cross-sectional view of the mobile communication terminal of FIG. 3 taken along the line 5-5 of FIG. 3.
Figure 4:
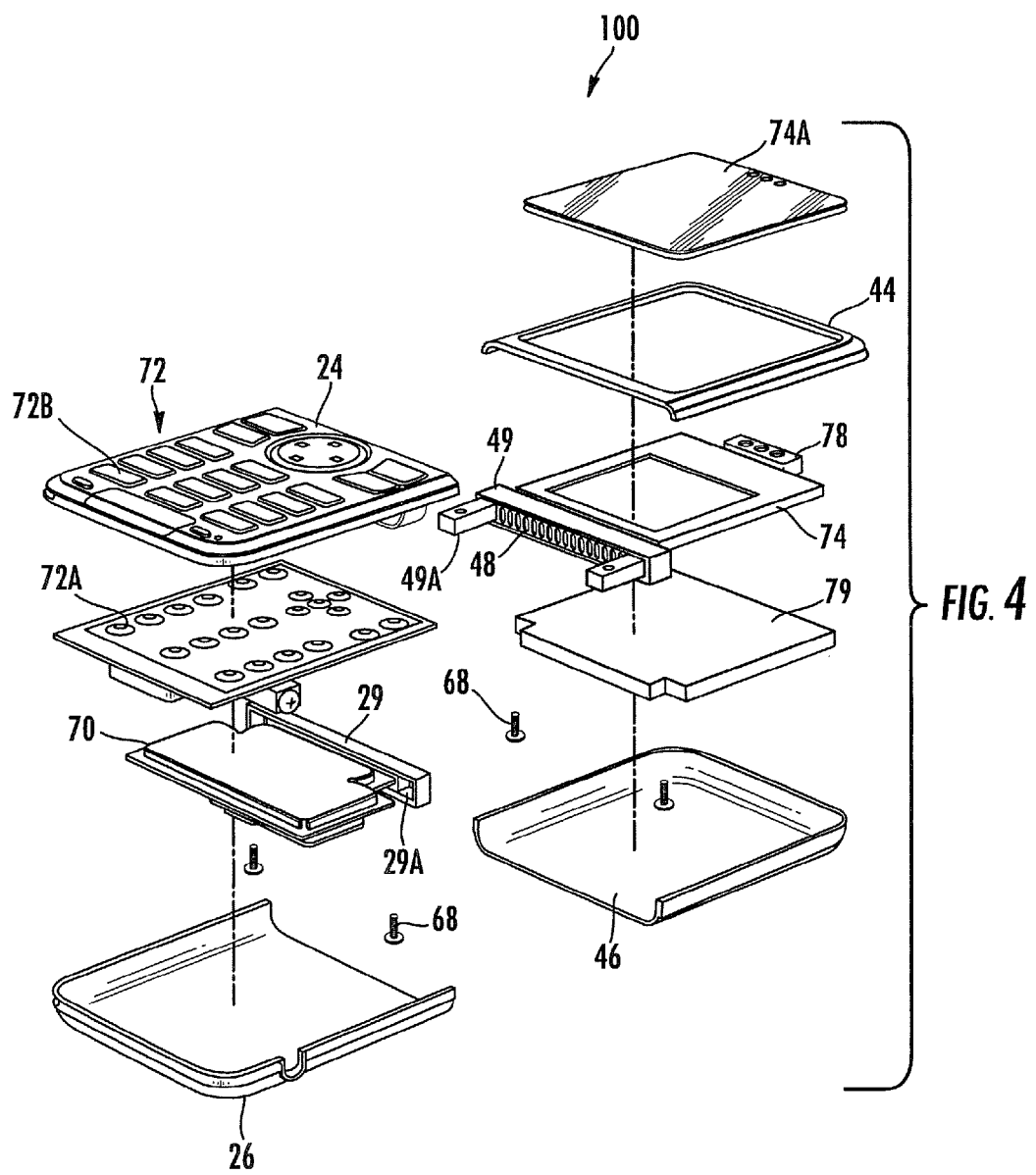
FIG. 4 is an exploded perspective view of the mobile communication terminal of FIG. 3.

With reference to FIG. 1, a flexible modular system 10 for constructing wireless communication terminals according to embodiments of the present invention is shown therein. The system 10 includes one or more keypad modules 20, one or more display modules 40, and a connector subsystem 60. The connector subsystem 60 includes one or more of a stick phone connector assembly 110, a flip phone connector assembly 210, a swivel phone connector assembly 310, and a slider phone connector assembly 410. As discussed in more detail herein, the flexible modular system 10 may be used to construct mobile wireless communication terminals 100, 200, 300, 400 having alternative functional form factors or configurations. The mobile wireless communication terminals 100, 200, 300, 400 are depicted generically in FIG. 2. According to some embodiments, the mobile wireless communication terminals 100, 200, 300, 400 differ from one another only in that alternative ones of the connector assemblies 110, 210, 310 and 410 are used to operably mechanically and electrically connect the keypad module 20 and the display module 40.

Referring again to FIG. 2, an exemplary radiotelephone communication system in accordance with embodiments of the present invention is illustrated, which includes the mobile wireless communication terminal 100, 200, 300, or 400 and a base station transceiver, which is part of a wireless communications network 5. In some embodiments of the present invention, the network 5 includes a base station transceiver that includes the radio transceiver(s) that define an individual cell in a cellular network and communicates with the mobile terminal 100, 200, 300, or 400 and other mobile terminals in the cell using a radio-link protocol. It will be understood that, in some embodiments of the present invention, many base station transceivers may be connected through, for example, a mobile switching center and other devices to define a wireless communications network.

According to some embodiments and as illustrated in FIGS. 3, 9, 17 and 18, the mobile terminals 100, 200, 300, 400 are handheld (portable) mobile terminals. By "handheld mobile terminal," it is meant that the outer dimensions of the mobile terminal are adapted and suitable for use by a typical operator using one hand. According to some embodiments, the total volume of the handheld mobile terminal is less than about 200 cc. According to some embodiments, the total volume of the handheld terminal is less than about 100 cc. According to some embodiments, the total volume of the handheld mobile terminal is between about 50 and 100 cc. According to some embodiments, no dimension of the handheld mobile terminal 100, 200, 300, 400 exceeds about 200 mm.

Turning to the keypad module 20 in more detail and with reference to FIGS. 2-8, the keypad module 20 includes a housing 22. The housing 22 of the keypad module 20 includes an inner housing part 24 and a cover 26. Fastener holes 24A (FIG. 6) are formed in the inner part 24. An opening 22A is defined in one end of the keypad module housing 22. An integral mechanical connector member 29 is mounted in the housing 22 adjacent the opening 22A. A pair of spaced apart slots 29A are defined in the mechanical connector member 29. An integral electrical connector or termination 28 is mounted in the mechanical connector member 29. According to some embodiments and as shown, the electrical connector 28 is an on board electrical connector; however, other suitable types of electrical connectors may be used. A main printed circuit board assembly (PCBA) 70, a keypad 72, a microphone 76, a communications module 80, and an antenna 82 are mounted in the keypad module housing 22.

A controller 70A and a memory 70B may be embodied on the main PCBA 70. The controller 70A may support various functions of the mobile terminal. The controller 70A can be any commercially available or custom microprocessor, for example.

The keypad 72 is connected to the controller 70A (for example, by an associated electromechanical switch) so that when a key is actuated the controller 70A registers a corresponding command. The keypad 72 includes a keypad printed circuit board assembly (PCBA) 72A and a keypad overlay 72B (e.g., formed of silicone rubber). The keys of the keypad 72 are selectively actuatable by the user pressing, deflecting and/or touching the respective key. Some or all of the keys of the keypad 72 are multifunction input keys. According to some embodiments, the keypad 72 is a numeric keypad. Other user interface devices may be provided such as other suitable input device(s).

The communication module 80 can include a cellular communication module, a direct point-to-point connection module, and/or a WLAN module. With a cellular communication module, the wireless terminal can communicate via the base station(s) of the network using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations may be connected to a Mobile Telephone Switching Office (MTSO) wireless network, which, in turn, can be connected to a PSTN and/or another network.

The communication module 80 may include a transceiver typically having a transmitter circuit 80A and a receiver circuit 80B, which respectively transmit outgoing radio frequency signals (e.g., to the network 5, a router or directly to another terminal) and receive incoming radio frequency signals (e.g., from the network 5, a router or directly from another terminal), such as voice and data signals, via the antenna 82. The communication module 80 may include a short-range transmitter and receiver, such as a Bluetooth transmitter and receiver. The antenna 82 may be an embedded antenna, a retractable antenna or any antenna known to those having skill in the art without departing from the scope of the present invention. The radio frequency signals transmitted between the mobile terminal and the network 5 may include both traffic and control signals (e.g., paging signals/messages for incoming calls), which are used to establish and maintain communication with another party or destination. The radio frequency signals may also include packet data information, such as, for example, cellular digital packet data (CDPD) information. In addition, the transceiver may include an infrared (IR) transceiver configured to transmit/receive infrared signals to/from other electronic devices via an IR port.

The microphone 76 is coupled to an audio processor that is configured to generate an audio data stream responsive to sound incident on the microphone.

Turning to the display module 40 in more detail, the display module 40 includes a display module housing 42. The housing 42 includes an inner housing part 44 and a cover 46. An opening 42A (FIG. 7) is defined in one end of the display module housing 42. An integral mechanical connector member 49 is mounted in the housing 42 adjacent the opening 42A. The mechanical connector member 49 includes two spaced apart, longitudinally extending prongs 49A. Fastener holes 49B are defined in the prongs 49A. An integral electrical connector or termination 48 is mounted in the mechanical connector member 49. According to some embodiments and as shown, the electrical connector 48 is an onboard electrical connector; however, other suitable types of electrical connectors may be used. A display device 74, a speaker 78, and a battery 79 are mounted in or on the display module housing 42.

The display device 74 may include, for example, a liquid crystal display (LCD) module. A protective cover sheet 74A (e.g., formed of polycarbonate) may be mounted on the display module housing 42 overlying the display device 74. In use, the controller 70A generates a display image on the display device 74.

The foregoing components of the mobile terminals may be included in many conventional mobile terminals and their functionality is generally known to those skilled in the art. As used herein, the term "portable electronic device" or "mobile terminal" may include: a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; a gaming device, an audio video player, and a conventional laptop and/or palmtop portable computer that may include a radiotelephone transceiver.

The connector subsystem 60 includes the integral mechanical connector members 29, 49 (FIG. 4), the integral electrical connectors 28, 48, a flip phone or clamshell connector module 220 (FIG. 13), a swivel phone connector module 320 (FIG. 17), a slider phone connector module 420 (FIG. 18), and a plurality of fasteners such as screws 68. Each of these components will be discussed in more detail hereinbelow.

In use, the flexible modular system 10 may be used to selectively configure, build or construct a mobile wireless communication terminal having one of a plurality of available alternative form factors. More particularly and as described in more detail below, an operator may combine a given keypad module 20 and a given display module 40 with a selected one of the alternative connector assemblies 110, 210, 310, 410 to provide the desired mobile wireless communication terminal. According to some embodiments, the connector assemblies releasably couple the modules 20, 40 so that the modules 20, 40 can be decoupled and reconfigured to construct a mobile terminal including the modules 20, 40 but having a different form factor or functionality.

With reference to FIGS. 3-8, according to a first option, the connector assembly 110 can be used to construct a stick phone 100 including the keypad module 20 and the display module 40. The mobile terminal 100 has an overall form factor or housing that is of a "one-piece" construction (i.e., does not have relatively movable housing portions). The connector assembly 110 includes the mechanical connector member 29, the mechanical connector member 49, the electrical connector 28, the electrical connector 48, and a pair of screws 68.

Figure 6:
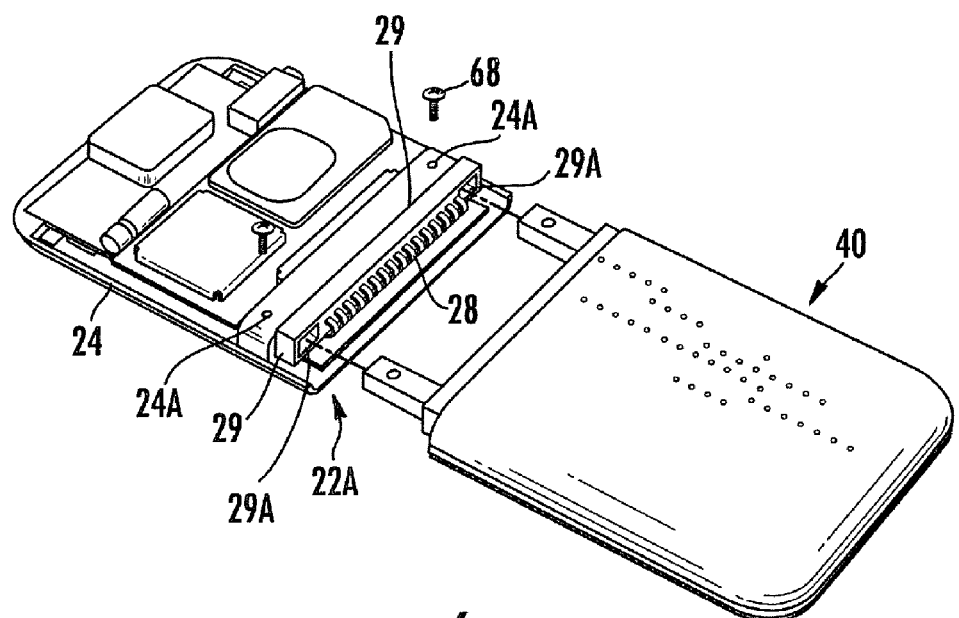
FIGS. 6 and 7 illustrate assembly steps for forming the mobile communication terminal of FIG. 3.
Figure 7:
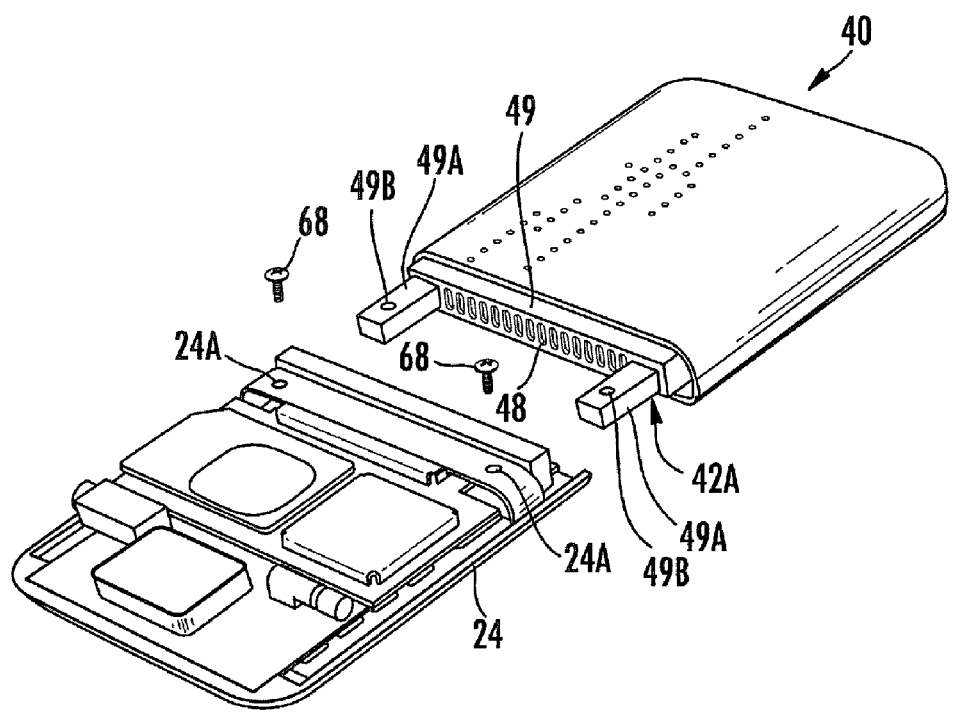
Figure 8:
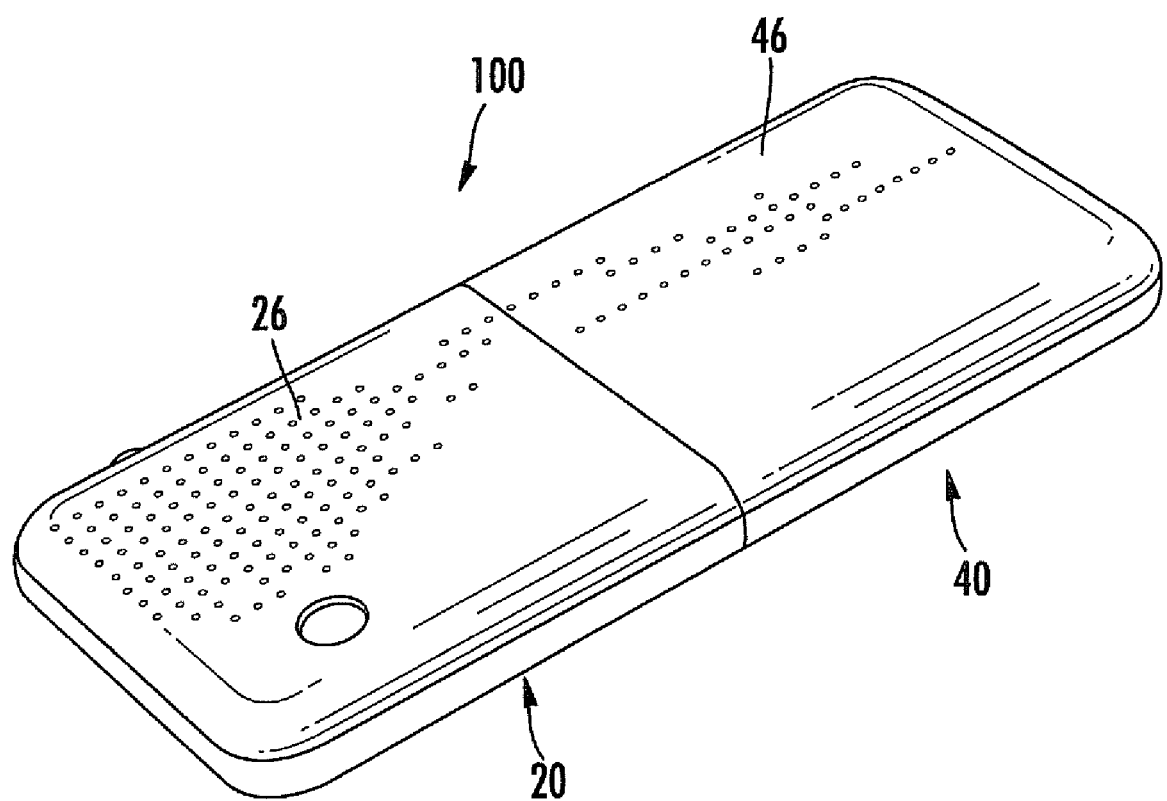
FIG. 8 is a rear perspective view of the mobile communication terminal of FIG. 3.
Figure 9:
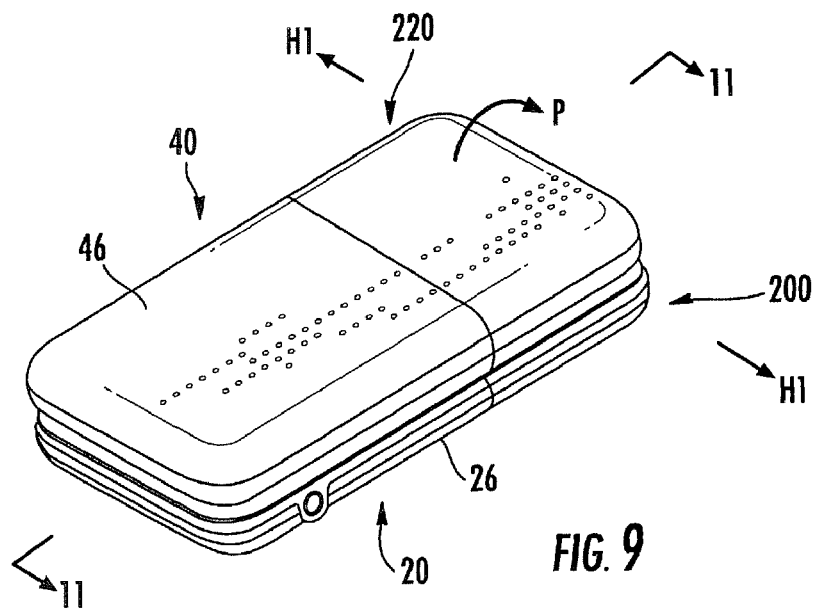
FIG. 9 is a top perspective view of a mobile communication terminal according to further embodiments of the present invention.
Figure 11:
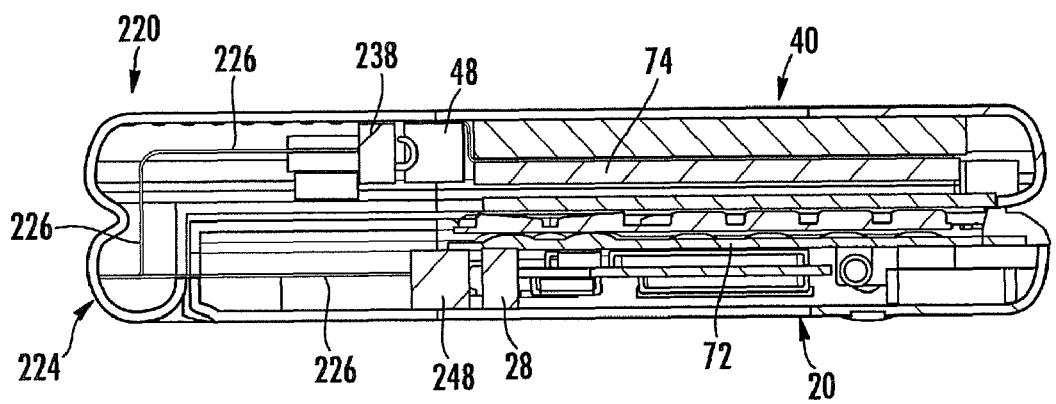
FIG. 11 is a cross-sectional view of the mobile communication terminal of FIG. 9 taken along the line 11-11 of FIG. 9.
Figure 12:
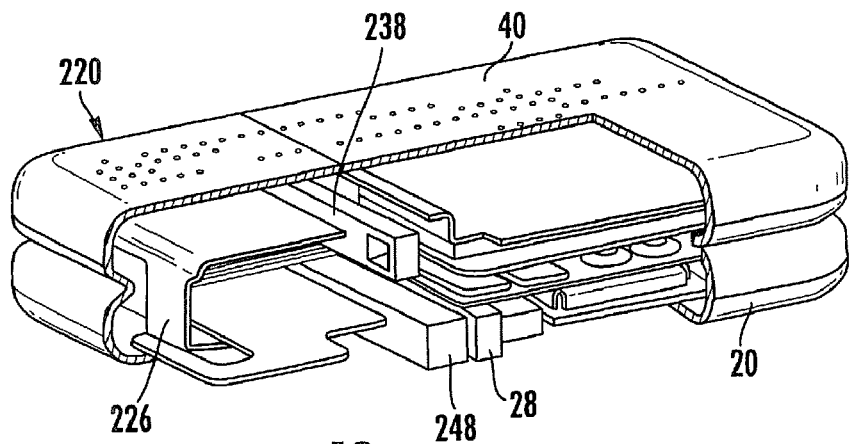
FIG. 12 is a fragmentary, perspective view of the mobile communication terminal of FIG. 9.
Figure 10:
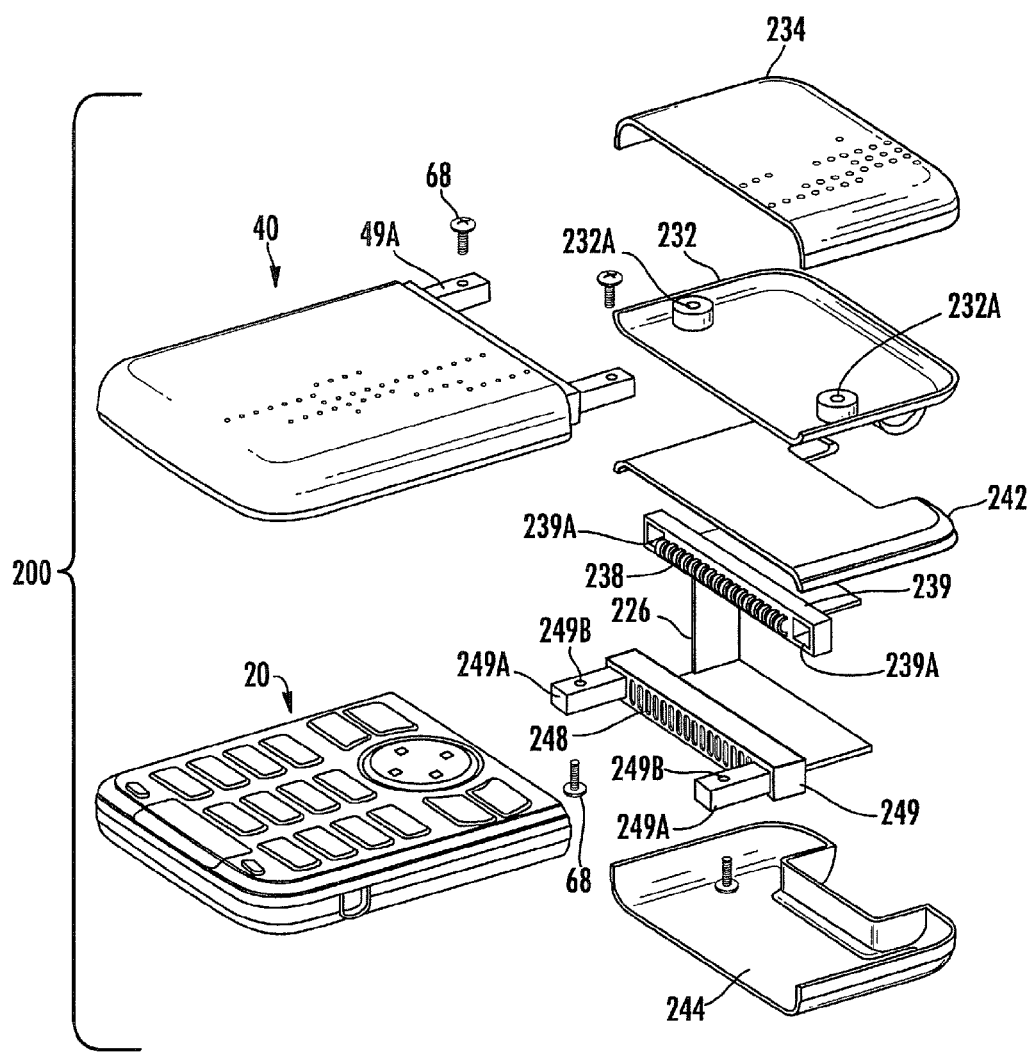
FIG. 10 is an exploded perspective view of the mobile communication terminal of FIG. 9.

According to embodiments of the present invention, assembly of the stick phone 100 is executed as follows. With reference to FIG. 6, the keypad module 20 is provided with the cover 26 removed. The display module 40 is inserted axially into the keypad module 20. More particularly, the prongs 49A of the mechanical connector 49 are inserted through the slots 29A in the mechanical connector 29 such that any fastener holes 49B align with the fastener holes 24A and the contacts of the electrical connector 28 are received by and operably electrically engage the electrical connector 48. The screws 68 are then inserted through the holes 24A and the holes 49B to secure the prongs 49B in place. The cover 26 is then mounted on the keypad module 20. According to some embodiments and as illustrated, the housings 22, 42 of the modules 20, 40 are in edge-to-edge abutment in the assembled mobile terminal 100.

With reference to FIGS. 9-16, according to a second option, the connector assembly 210 can be used to construct a clamshell or flip phone 200 including the keypad module 20 and the display module 40. The connector assembly 210 includes the mechanical connector member 29, the mechanical connector member 49, the electrical connector 28, the electrical connector 48, two pairs of the screws 68, and the flip phone connector module 220.

The flip phone connector module 220 includes a housing assembly 222 and a hinge mechanism 224. The housing assembly 222 includes a top subhousing 230 and a bottom subhousing 240 pivotally connected by the hinge mechanism 224.

Figure 13:
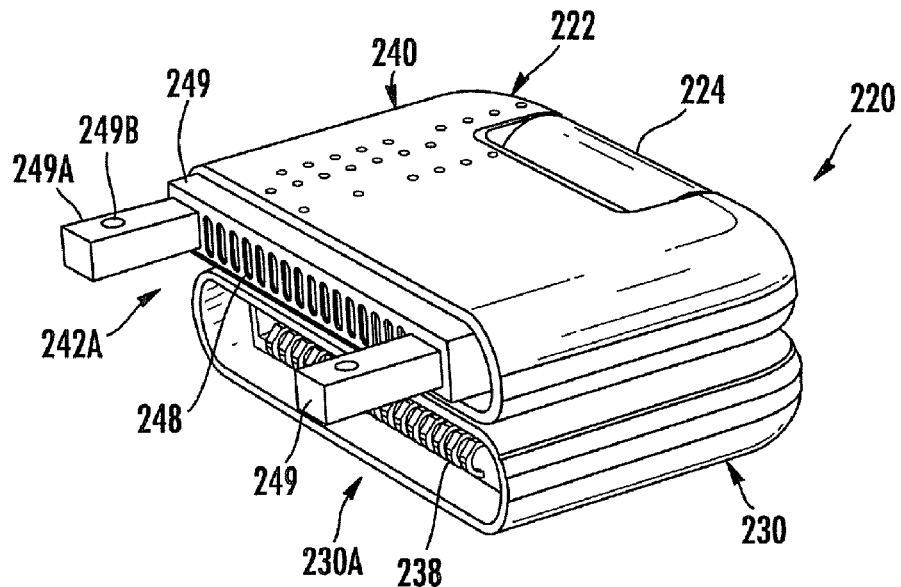
FIG. 13 is a perspective view of a flip phone connector module forming a part of the mobile communication terminal of FIG. 9.

The top subhousing 230 includes a top housing part 232 and a cover 234. Fastener holes 232A are defined in the top housing part 232. The top subhousing 230 defines an opening 230A (FIG. 13). An integral mechanical connector member 239 is mounted in the subhousing 230 adjacent the opening 230A. A pair of spaced apart slots 239A are defined in the mechanical connector member 239. An integral electrical connector or termination 238 is mounted in the mechanical connector member 239. According to some embodiments and as shown, the electrical connector 238 is an onboard electrical connector; however, other suitable types of electrical connectors may be used.

The bottom subhousing 240 includes a bottom housing part 242 and a cover 244. Integral prongs 242A extend longitudinally from the bottom housing part 242. The bottom subhousing 240 defines an opening 242A (FIG. 13). An integral mechanical connector member 249 is mounted in the housing 242 adjacent the opening 242A. The mechanical connector member 249 includes two spaced apart, longitudinally extending prongs 249A. Fastener holes 249B are defined in the prongs 249A. An integral electrical connector or termination 48 is mounted in the housing 242 adjacent the opening 242A. According to some embodiments and as shown, the electrical connector 248 is an onboard electrical connector; however, other suitable types of electrical connectors may be used.

The flip phone connector module 220 further includes a flexible printed circuit (FPC) member 226 that extends through each of the subhousings 230, 240 and across the hinge mechanism 224 between the subhousings 230, 240. The FPC 226 is operably electrically terminated on each end by the electrical connectors 238 and 248, respectively.

In the flip phone 200, the display module 40 is pivotally coupled to the keypad module 20 by the hinge mechanism 224 to form a clamshell or flip housing assembly. The keypad module 20 and the display module 40 can be pivoted in a direction P about a transverse axis H1-H1 of the hinge mechanism 224 between an open or deployed position and a stored or closed position wherein the display module 40 overlies the keypad module 20 as shown in solid lines in FIG. 9.

Figure 14:
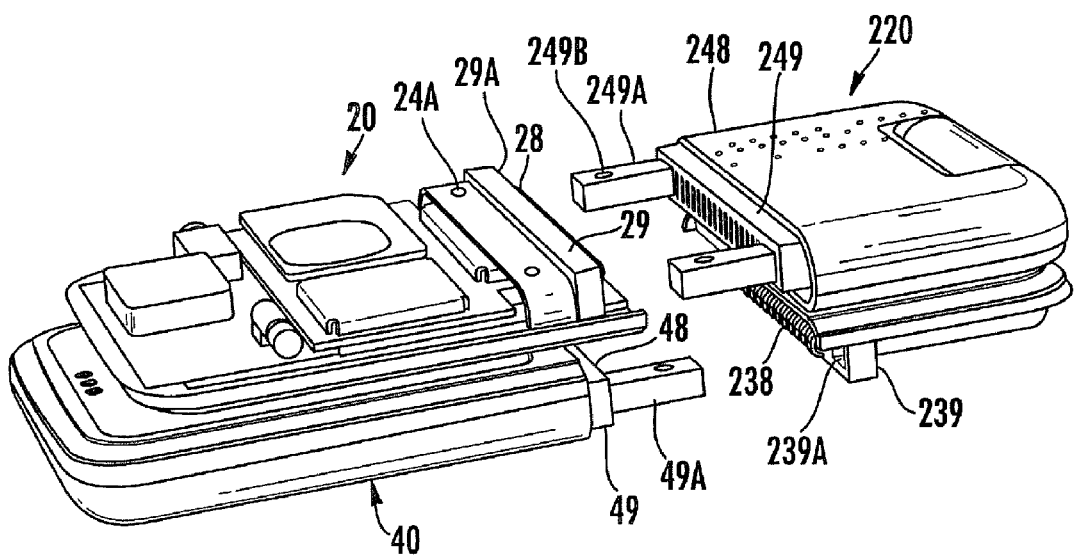
FIGS. 14 and 15 illustrate assembly steps for forming the mobile communication terminal of FIG. 9.
Figure 15:
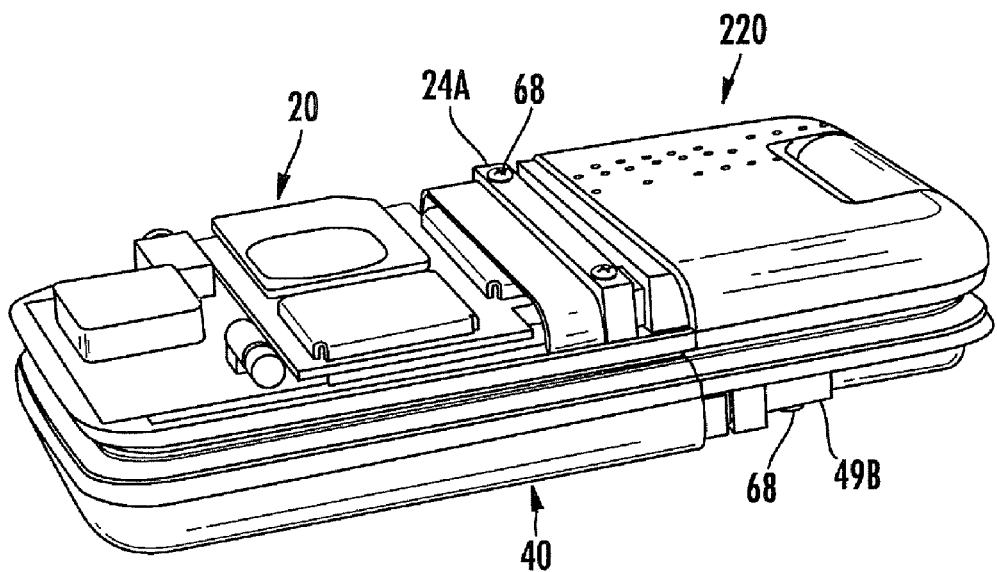
Figure 16:
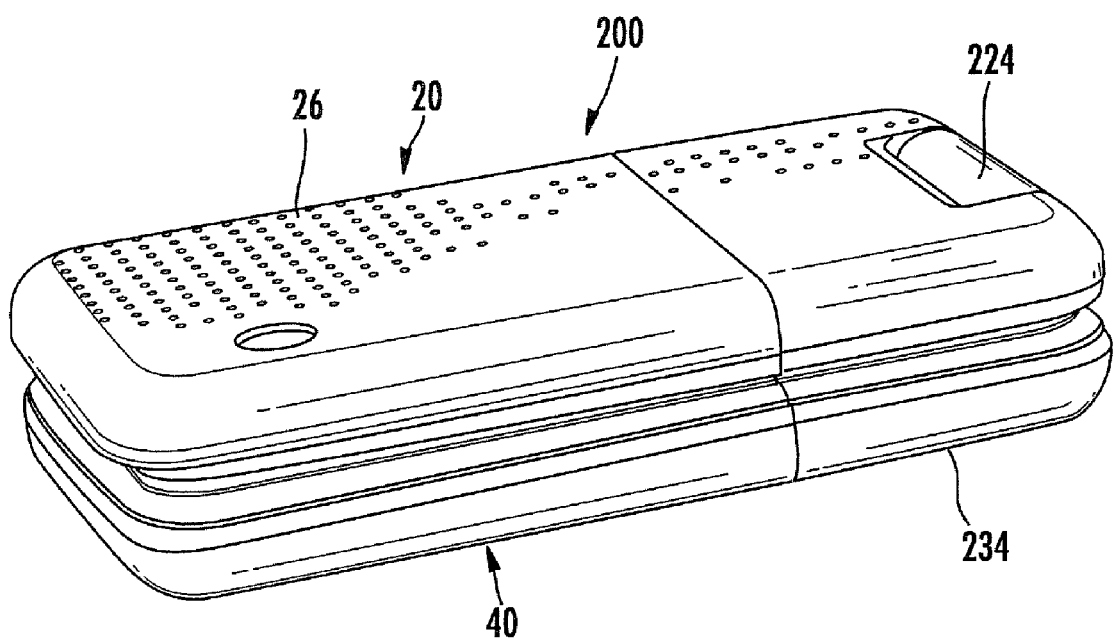
FIG. 16 is a bottom perspective view of the mobile communication terminal of FIG. 9.

According to embodiments of the present invention, assembly of the flip phone 200 is executed as follows. With reference to FIGS. 10-16, the keypad module 20 is provided without the cover 26 installed and the hinge module 220 is provided without the cover 234 installed as shown in FIG. 14. The hinge module 220 is inserted into the mechanical connector member 29 of the keypad module 20 such that the prongs 249B extend through the slots 29A and the electrical connector 248 engages the electrical connector 28. Screws 68 are inserted through the holes 24A and 249B to secure the keypad module 20 to the hinge module 220 (FIG. 15). The display module 40 is inserted into the hinge module 220 such that the prongs 49A of the mechanical connector member 49 extend through the slots 239A and the electrical connector 48 operably engages the electrical connector 238. Screws 68 are inserted through the holes 49B and 232A to secure the display module 40 to the hinge module 220. The covered 26 is installed on the keypad module 20 and the cover 234 is installed on the hinge module 220 as shown in FIG. 16.

Figure 17:
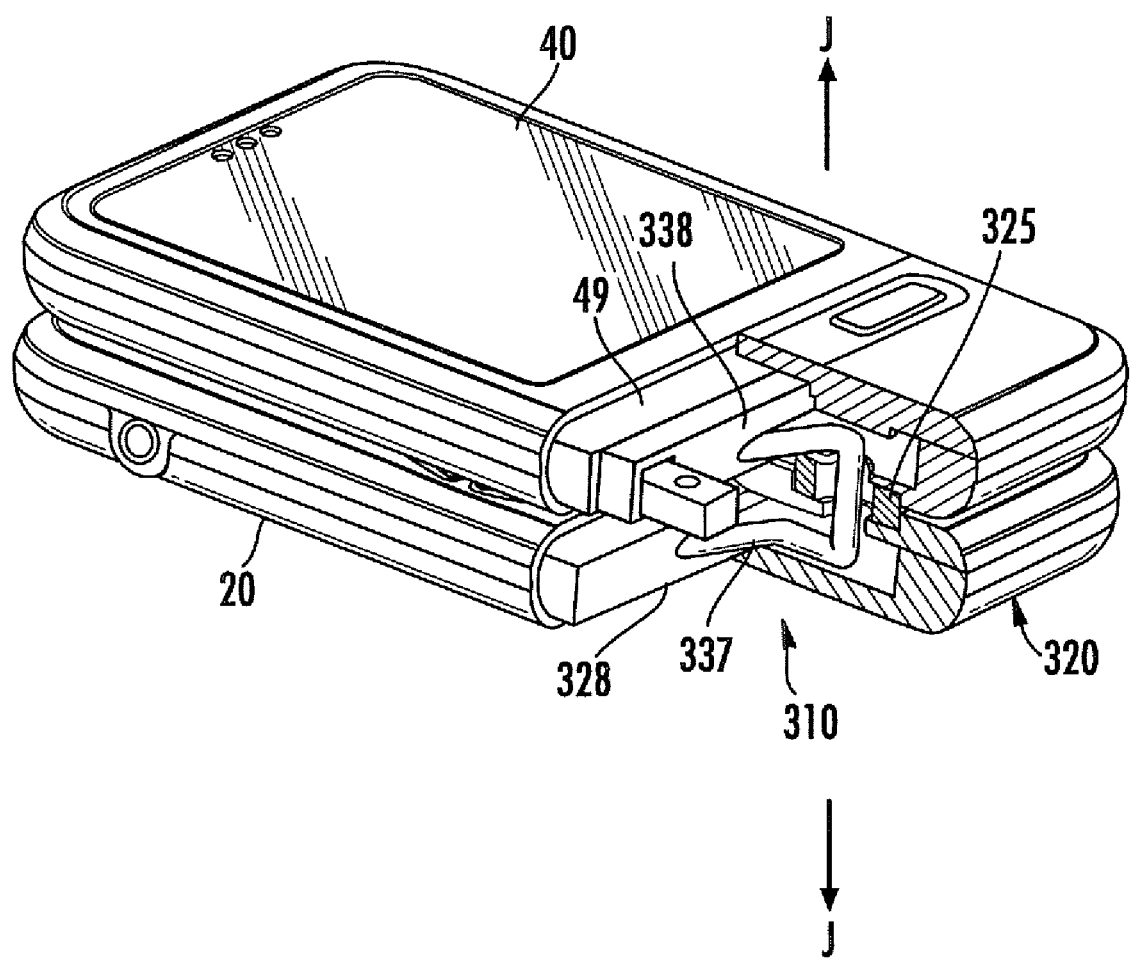
FIG. 17 is a fragmentary, perspective view of a mobile communication terminal according to further embodiments of the present invention.

With reference to FIG. 17, according to a third option, the swivel connector assembly 310 can be used to constrict a swivel phone 300 including the keypad module 20 and the display module 40. The connector assembly 310 includes the mechanical connector member 29, the mechanical connector member 49, the electrical connector 28, the electrical connector 48, two pairs of the screws 68, and the swivel phone connector module 320. The swivel phone connector module 320 may be constructed in the same manner as the flip phone connector module 220 except that the hinge mechanism 224 is replaced with a swivel mechanism 325 that pivots about an axis J-J. The swivel mechanism 325 may enable a user to rotate the display module 40 with respect to the keypad module between a closed position wherein the display module 40 covers the keypad module 20 (as shown in FIG. 17) and an open position wherein the display module 40 is rotated (e.g., 180 degrees) to extend away from the keypad module 20. In order to accommodate the various movements of the swivel mechanism 325, the FPC 226 of the flip phone connector module 220 may be replaced with a coaxial cable 327, for example, electrically coupling the electrical connectors 338, 348. The swivel phone 300 may be assembled using the swivel connector assembly 310 in the same manner as described above with regard to the flip phone 200 and the flip phone connector assembly 210.

According to further embodiments, the swivel phone connector module 320 may be modified to form a hinge/swivel connector module that further includes a hinge mechanism corresponding to the hinge mechanism 224. In this case, the display module 40 is also pivotable relative to the keypad module about a hinge axis transverse to the swivel axis J-J, thereby enabling two degrees of freedom of motion.

Figure 18:
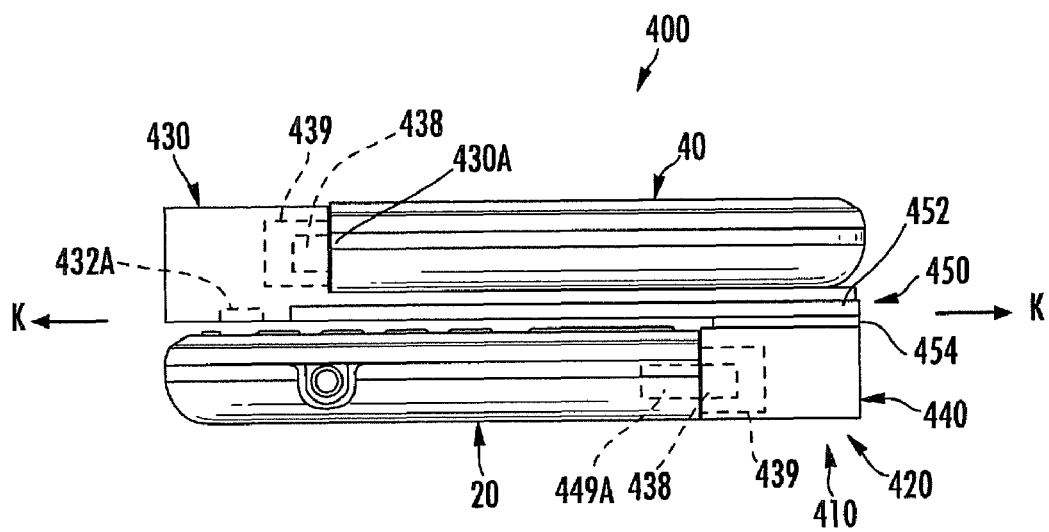
FIG. 18 is a side view of a mobile communication terminal according to further embodiments of the present invention, wherein the mobile communication terminal is in a closed position.
Figure 19:
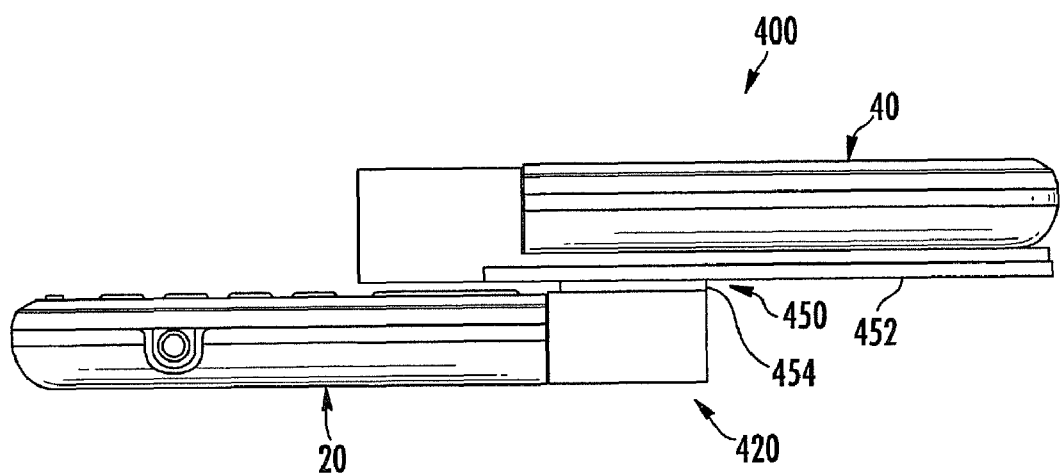
FIG. 19 is a side view of the mobile communication terminal of FIG. 18, wherein the mobile communication terminal is in an open position.

With reference to FIGS. 18 and 19, according to a fourth option, the slider connector assembly 410 can be used to construct a slider phone 400 including the keypad module 20 and the display module 40. The connector assembly 410 includes the mechanical connector member 29, the mechanical connector member 49, the electrical connector 28, the electrical connector 48, two pairs of the screws 68, and the slider phone connector module 420.

The slider phone connector module 420 includes a housing assembly and a slide mechanism 424. The housing assembly includes a top subhousing 430 and a bottom subhousing 440 slidably connected by the slider mechanism 450. The top subhousing 430 defines an opening 430A. An integral mechanical connector member 439 corresponding to the mechanical connector member 239 and an electrical connector 448 corresponding to the electrical connector 238 are mounted in the top subhousing 430 adjacent the opening 430A. Fastener holes 432A are defined in the top subhousing 430

An integral mechanical connector member 449 corresponding to the mechanical connector member 249 and an electrical connector 448 corresponding to the electrical connector 248 are mounted in the bottom subhousing 440. The integral prongs 449A of the mechanical connector member 449 extend longitudinally into the keypad module 20.

The slider mechanism 450 includes a first pair of laterally spaced apart top slide rails 452 and a mating pair of laterally spaced apart bottom slide rails 454. The slider phone connector module 420 further includes a flexible printed circuit (FPC) member (not shown) corresponding to the FPC 226 that extends through each of the subhousings 430, 440 and between the slide rails 452, 454 and the subhousings 430, 440 and is terminated by the electrical connectors 438, 448.

The slider mechanism 450 enables the user to slide the display module 40 along a longitudinal slide axis K-K relative to the keypad module 20 between an open or deployed position as shown in FIG. 19 and a closed or stored position wherein the display module 40 overlies (i.e., is slid onto and over) the keypad module 20 as shown in FIG. 18.

According to embodiments of the present invention, assembly of the slider phone 400 is executed as follows and in similar manner to the assembly of the mobile terminal 200. The display module 40 is inserted into the slider module 420 such that the prongs 49A of the mechanical connector member 49 extended through the slots of the mechanical connector member 439 and the electrical connector 48 operably engages the electrical connector 438. Screws 68 are inserted through the holes 49B and 432A to secure the display module 40 to the slider module 420. The slider module 420 is then inserted into the mechanical connector member 29 of the keypad module 20 such that the prongs 449B extended through the slots 29A and the electrical connector 248 engages the electrical connector 28. Screws 68 are inserted through the fastener holes in the prongs 449A and the holes 24A to secure the keypad module 20 to the bottom subhousing 440 of the slider module 420. The cover 26 is installed on the keypad module 20.

In accordance with some embodiments of presentation, connector modules as described herein may be provided with one or more integral supplemental functional electronic devices. Exemplary connector modules in accordance with embodiments of the present invention are illustrated in FIGS. 20-22 and described in more detail hereinbelow.

Figure 20:
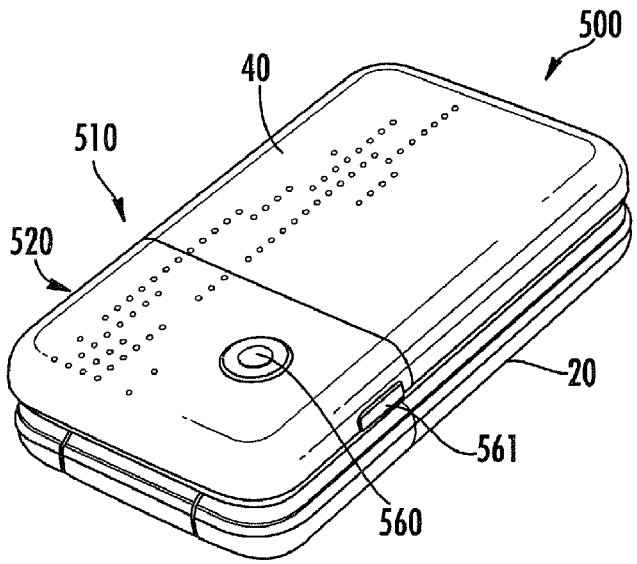
FIG. 20 is a perspective view of a mobile communication terminal according to further embodiments of the present invention.

With reference to FIG. 20, a mobile wireless communication terminal 500 having a flip phone form factor according to embodiments of the present invention is shown therein. The flip phone 500 includes the keypad module 20 and the display module 40 coupled by a connection assembly 510. The connection assembly 510 corresponds to the connection assembly 210 except that the flip phone connector module 220 is replaced with a modified flip phone connector module 520. The modified flip phone connector module 520 corresponds to the flip phone connector module 220 except that the flip phone connector module 520 further includes an integral camera module 560 and an integral removable/replaceable memory card slot 561. The camera module 560 and the memory card slot 561 may be operably electrically connected to the controller 70A, for example.

Figure 21:
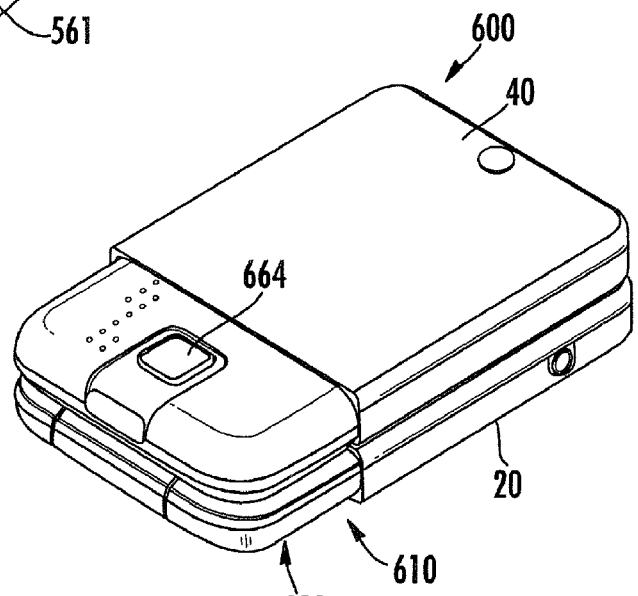
FIG. 21 is a perspective view of a mobile communication terminal according to further embodiments of the present invention.

With reference to FIG. 21, a mobile wireless communication terminal 600 according to further embodiments of the present invention is shown therein. The mobile terminal 600 corresponds to the mobile terminal 500 except that a connector module 620 is used in place of the connector module 520 to form a connector assembly 610. The connector module 620 includes an integral flashlight device 664. The flashlight device 664 may include a light emitting diode (LED) or other suitable type of light source. The flashlight device 664 may be powered by its own battery (which may also be integrated into the connector module 620) or may be powered by the battery 79.

Figure 22:
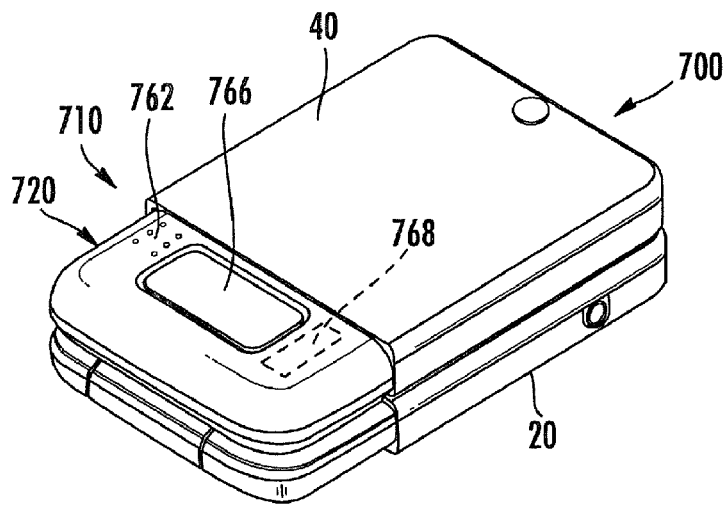
FIG. 22 is a perspective view of a mobile communication terminal according to further embodiments of the present invention.

With reference to FIG. 22, a mobile wireless communication terminal 700 according to further embodiments of the present invention is shown therein. The mobile terminal 700 corresponds to the mobile terminal 500 except that a connector module 720 is used in place of the connector module 520 to form a connector assembly 710. The connector module 720 includes an integral supplemental speaker 762, an integral display device 766, and an integral radio module 768 (e.g., an FM radio receiver). The display device 766 may include an LCD, for example, and may be used to display information related to the radio module 786 or other functions of the mobile terminal 700. For example, the display device 766 may serve as an external display device of the mobile terminal 700 to supplement the internal display device 74. The supplemental speaker 762, the display device 766, and the radio module 768 may each be operably electrically connected to the controller 70A, for example.

According to further embodiments of the present invention, connector modules as described herein may incorporate an integral battery. The integral battery may supplement the onboard battery 79. According to still further embodiments of the present invention, connector modules as described herein may incorporate other types of energy sources. For sample, according to some embodiments, a connector module as described herein includes an integral kinetic motion electrical generator.

It will be appreciated that according to further embodiments, different combinations of integral supplemental functional electronic devices may be incorporated into a given connector module of the present invention. Similarly, it will be appreciated that these supplemental functional electronic devices can be integrated into connector modules of different form factors and the flip phone connector module (e.g., a speaker, display, flashlight, or the like may be incorporated into the swivel phone connector module 310 or the slider phone connector module 410).

According to some embodiments of the present invention, mobile wireless communication terminals as described herein are assembled in a factory or commercial mass production facility. The factory has in its inventory a plurality (e.g., a substantial number) of the keypad modules 20 and the display modules 40. The factory also has on hand the connector assemblies 110, 210, 310, 410, 510, 610, 710 or the like of two or more types. The factory can thereby flexibly assemble (produce) mobile terminals, each including a keypad module 20 and a display module 40 and having whatever form factor and feature set are currently desired. According to some embodiments, the factory assembles the mobile terminals 100, 200, 300, and/or 400 as custom units on demand. Systems and methods of the present invention can allow a manufacturer to design and manufacture keypad and display modules having a single or standard electronic and mechanical platform for multiple mobile terminal form factors. As a result, significant improvements in flexibility and time and cost savings may be realized as compared to tooling for and designing a unique electronic platform and mechanical design for each mobile terminal having a different form factor.

According to some embodiments of the present invention, wireless communication terminals as described herein are assembled by a distributor or retailer. The distributor or retailer has in its inventory a plurality (e.g., a substantial number) of the keypad modules 20 and the display modules 40. The distributor or retailer also has on hand the connector assemblies 110, 210, 310, 410, 510, 610, 710 or the like of two or more types. The distributor or retailer can thereby flexibly assemble mobile terminals each including a keypad module 20 and a display module 40 and having whatever form factor and feature set are currently desired by a customer. According to some embodiments, the distributor or retailer assembles the mobile terminals 100, 200, 300, and/or 400 as custom units on demand. For example, a retailer may allow a customer to choose a given form factor, and then assemble a mobile terminal having the requested form factor on-site.

According to some embodiments, wireless communications terminals as described herein are assembled by an end user (i.e., consumer or personal user). The end user has a keypad module 20 and a display module 40. The end user also has on hand the connector assemblies 110, 210, 310, 410, 510, 610, 710 or the like of two or more types. The end user can thereby flexibly assemble mobile terminals each including her keypad module 20 and her display module 40 and having whatever form factor and/or feature set/functionality she currently desires. According to some embodiments, the end user can reconfigure her mobile terminal at will by interchanging in the connector assemblies. Thus, the end user may conveniently accessorize and change the form factor and functionality of her mobile terminal.

While the connector module subsystem 60 is described and illustrated hereinabove as including a stick phone connector assembly 110, a flip phone connector assembly 210, a swivel phone connector assembly 310, and a slider phone connector assembly 410, according to some embodiments the connector module subsystem may omit one or more of the connector assemblies 110, 210, 310, 410. Furthermore, connector assemblies of other configurations may be provided in accordance with further embodiments of the present invention.

Figure 23:
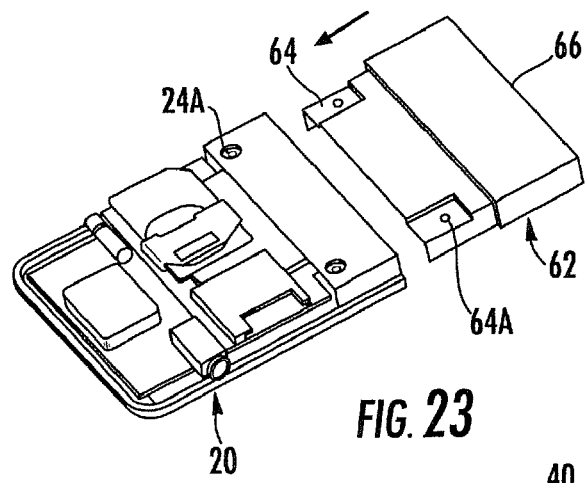
FIGS. 23-25 illustrate a mobile communication terminal according to further embodiments of the present invention and steps for assembling the same.
Figure 24:
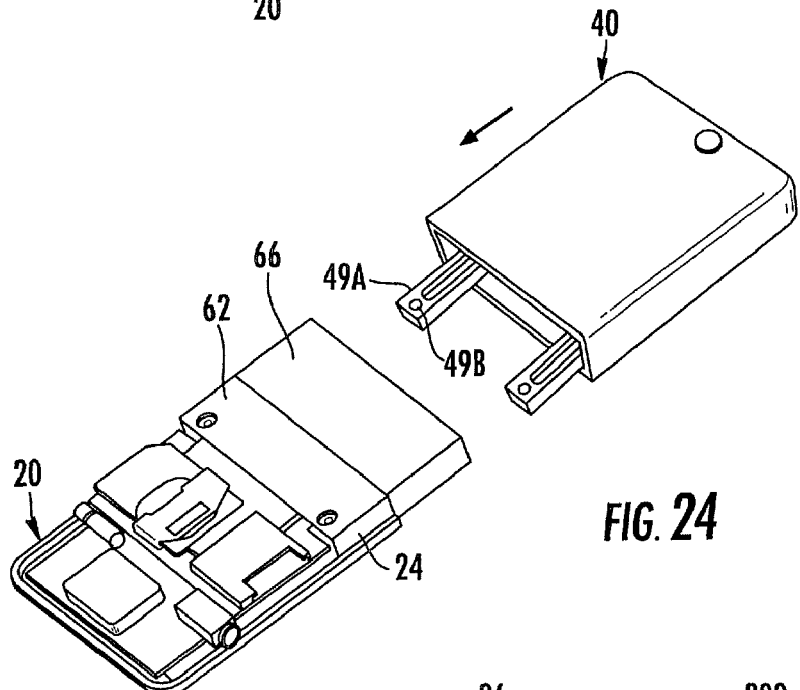
Figure 25:
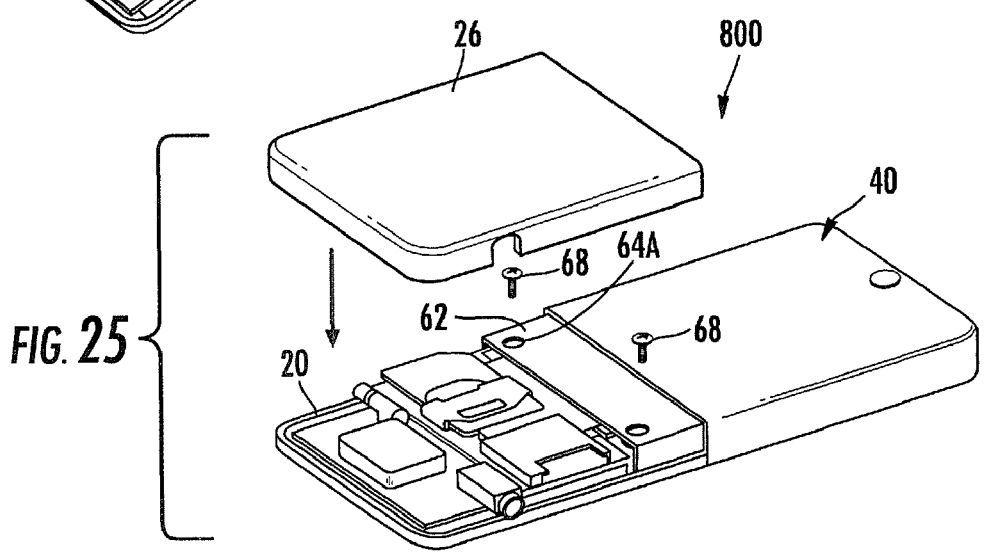

With reference to FIGS. 23-25, a mobile terminal 800 according to further embodiments is shown therein. The mobile terminal 800 may generally correspond to the mobile terminal 100 except that the mobile terminal 800 further includes a supplemental connector member or plate 62 to provide improved rigidity or bracing between the keypad module 20 and the display module 40. The mobile terminal 800 may be assembled in the same manner as the mobile terminal 100 except that a first part 65 of the connector plate 62 is inserted into the inner part 24 of the keypad module 20, and the prongs 49A of the display module 40 are then inserted through the connector plate 62 such that a second part 66 of the connector plate 62 is received in the display module 40. The screws 68 are installed such that they extend through the holes 64A in the connector plate 62 as well as the holes 24A and 49A of the modules 20, 40. Connector plates 62 may be similarly incorporated into the mechanical connections between the modules 20, 40 and each of the modules 220, 320, 420, 520, 620, 720, for example.

The various housing components and connector components as described herein may be formed of a polymeric material, such as polystyrene. Alternatively or additionally, the housing and connector components may be formed of any other suitable material, such as metal. The housing and connector components may be molded and may be assembled from multiple parts.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A flexible modular system for constructing a wireless communication terminal, the modular system comprising:
    a keypad module including a keypad module housing and a keypad mounted on the keypad module housing;
    a display module including a display module housing and a display device mounted on the display module housing; and
    a connector subsystem to selectively alternatively mechanically join the keypad module and the display module to form an integral wireless communication terminal having a first form factor and, alternatively, an integral wireless communication terminal having a second form factor different from the first form factor;
    wherein the connector subsystem includes a connector module that is a separate modular component from each of the keypad module and the display module and can be selectively interchangeably mounted to each of and between the keypad module and the display module to selectively mechanically join the keypad module and the display module to form the integral wireless communication terminal having the first form factor, the connector module including:
        at least one mechanical coupling feature to secure the connector module to each of the keypad module and the display module; and
        at least one electrical connector to electrically couple the keypad module to the display module; and
    wherein the connector subsystem further includes at least one fastener to secure the mechanical coupling feature to at least one of the keypad module and the display module, wherein the mechanical coupling feature is configured to receive the fastener.

2. The modular system of claim 1 wherein the first and second form factors are each selected from the group consisting of a stick phone configuration, a flip phone configuration, a swivel phone configuration, and a slider phone configuration.

3. The modular system of claim 1 wherein the connector subsystem can be used to selectively alternatively mechanically join the keypad module and the display module to form an integral wireless communication terminal having a third form factor different from the first and second form factors.

4. The modular system of claim 1 wherein:
    the connector subsystem includes a second connector module; and
    the second connector module can be interchangeably mounted between the keypad module and the display module to selectively mechanically join the keypad module and the display module to form the integral wireless communication terminal having the second form factor.

5. The modular system of claim 1 wherein the connector module includes an integral supplemental functional electronic device.

6. The modular system of claim 5 wherein the supplemental functional electronic device includes a removable memory card slot.

7. The modular system of claim 5 wherein the supplemental functional electronic device includes a camera.

8. The modular system of claim 5 wherein the supplemental functional electronic device includes a radiofrequency receiver, transmitter and/or transceiver.

9. The modular system of claim 5 wherein the supplemental functional electronic device includes a flashlight.

10. The modular system of claim 5 wherein the supplemental functional electronic device includes a battery.

11. The modular system of claim 5 wherein the supplemental functional electronic device includes a kinetic motion electrical generator.

12. The modular system of claim 5 wherein the supplemental functional electronic device includes a supplemental display device.

13. The modular system of claim 5 wherein the supplemental functional electronic device includes a loudspeaker.

14. The modular system of claim 1 wherein the fastener is a screw.

15. The modular system of claim 1 wherein the mechanical coupling feature includes a prong configured to be inserted into the at least one of the keypad module and the display module and including a slot to receive the fastener.

16. The modular system of claim 15 further including:
    a second fastener; and
    a second prong configured to be inserted into the at least one of the keypad module and the display module and including a second slot to receive the second fastener to secure the connector module to the at least one of the keypad module and the display module.

17. The modular system of claim 1 further including a supplemental connector member configured to be received in each of the connector module and the at least one of the keypad module and the display module to provide bracing between the connector module and the at least one of the keypad module and the display module.

18. The modular system of claim 17 wherein the supplemental connector member includes a slot to receive the at least one fastener.

19. The modular system of claim 1 wherein the connector module includes an integral supplemental functional electronic device selected from the group consisting of: a removable memory card slot; a camera; a radiofrequency receiver, transmitter and/or transceiver; a flashlight; a battery; a kinetic motion electrical generator; a supplemental display device; and a loudspeaker.

20. The modular system of claim 1 wherein the second form factor is a stick phone configuration wherein the keypad module and the display module are directly engaged and mechanically secured without the presence of an intervening connector module.

21. The modular system of claim 1 wherein the connector module includes a cover to conceal the fastener and that must be removed to permit access to the fastener when the fastener is securing the mechanical coupling feature to the at least one of the keypad module and the display module in order to decouple the connector module from the at least one of the keypad module and the display module.

22. The modular system of claim 1 including:
a first mechanical coupling feature to engage and secure the connector module to the keypad module;
a first electrical connector to engage and electrically couple the connector module to the keypad module;
a first fastener to secure the first mechanical coupling feature to the keypad module, wherein the first mechanical coupling feature is configured to receive the first fastener;
a second mechanical coupling feature to engage and secure the connector module to the display module;
a second electrical connector to engage and electrically couple the connector module to the display module; and
a second fastener to secure the second mechanical coupling feature to the display module, wherein the second mechanical coupling feature is configured to receive the second fastener.

* * * * *